(12) United States Patent
Dasbach

(10) Patent No.: US 11,097,806 B2
(45) Date of Patent: Aug. 24, 2021

(54) CONTROL METHOD AND DEVICES FOR CONTROLLING THE ELECTRIC MOTOR OF AN ELECTRIC BICYCLE

(71) Applicant: Robert Bosch GmbH, Stuttgart (DE)

(72) Inventor: Gregor Dasbach, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 16/305,477

(22) PCT Filed: Mar. 31, 2017

(86) PCT No.: PCT/EP2017/057699
§ 371 (c)(1),
(2) Date: Nov. 29, 2018

(87) PCT Pub. No.: WO2017/207132
PCT Pub. Date: Dec. 7, 2017

(65) Prior Publication Data
US 2020/0324855 A1   Oct. 15, 2020

(30) Foreign Application Priority Data

May 30, 2016   (DE) ...................... 10 2016 209 275.8

(51) Int. Cl.
*B62M 6/45*     (2010.01)
*B60L 50/20*    (2019.01)
(Continued)

(52) U.S. Cl.
CPC .............. *B62M 6/45* (2013.01); *B60L 50/20* (2019.02); *B62M 6/55* (2013.01); *B60L 2200/12* (2013.01);
(Continued)

(58) Field of Classification Search
CPC .......... B62M 6/45; B62M 6/55; B62M 25/08; B60L 50/20; B60L 2200/12; B60L 2240/423
See application file for complete search history.

(56) References Cited

U.S. PATENT DOCUMENTS

| | | | | |
|---|---|---|---|---|
| 4,946,425 A | * | 8/1990 | Buhlmann | B62M 9/122 192/142 R |
| 5,599,244 A | * | 2/1997 | Ethington | B62M 9/122 280/261 |

(Continued)

FOREIGN PATENT DOCUMENTS

| | | |
|---|---|---|
| CN | 1515451 A | 7/2004 |
| CN | 202911903 U | 5/2013 |

(Continued)

OTHER PUBLICATIONS

International Search Report corresponding to PCT Application No. PCT/EP2017/057699, dated Jun. 12, 2017 (German and English language document) (8 pages).

*Primary Examiner* — Richard M Camby
(74) *Attorney, Agent, or Firm* — Maginot, Moore & Beck LLP

(57) ABSTRACT

A control method for controlling an electric motor of an electric bicycle in dependence on an applied transmission ratio of a gear shift includes detecting a pedaling torque of the bicycle rider and detecting the applied transmission ratio of the gear shift. In addition, the control method controls the electric motor for the drive of the electric bicycle in dependence on the detected pedaling torque and the detected transmission ratio in order to generate a torque of the electric motor. The bicycle rider is thus supported by the electric motor while driving the electric bicycle in dependence on the applied transmission ratio.

12 Claims, 4 Drawing Sheets

(51) Int. Cl.
*B62M 6/55* (2010.01)
*B62M 25/08* (2006.01)

(52) U.S. Cl.
CPC ........ *B60L 2240/423* (2013.01); *B62M 25/08* (2013.01)

(56) References Cited

U.S. PATENT DOCUMENTS

| | | | |
|---|---|---|---|
| 5,826,675 A * | 10/1998 | Yamamoto | B62M 6/45 180/220 |
| 6,119,801 A * | 9/2000 | Yamashita | B62M 6/10 180/205.5 |
| 7,156,780 B1 * | 1/2007 | Fuchs | A63B 21/00178 482/92 |
| 8,768,585 B2 | 7/2014 | Cheng | |
| 9,555,854 B2 * | 1/2017 | Bendel | B62K 11/00 |
| 9,796,449 B2 * | 10/2017 | Dommsch | B62M 6/55 |
| 2013/0090819 A1 | 4/2013 | Cheng | |
| 2016/0280328 A1 * | 9/2016 | Yamamoto | B62M 11/14 |
| 2016/0325802 A1 * | 11/2016 | Leiber | C22B 25/06 |

FOREIGN PATENT DOCUMENTS

| | | |
|---|---|---|
| CN | 103359251 A | 10/2013 |
| CN | 104554612 A | 4/2015 |
| DE | 601 10 853 T2 | 11/2005 |
| DE | 10 2010 028 658 A1 | 11/2011 |
| DE | 10 2012 107 938 A1 | 2/2013 |
| DE | 10 2013 004 886 A1 | 10/2013 |
| DE | 10 2014 101 567 A1 | 8/2014 |
| DE | 10 2014 113 702 A1 | 3/2015 |
| DE | 10 2014 015 630 A1 | 4/2015 |
| EP | 0 786 399 A2 | 7/1997 |
| EP | 0 786 399 B1 | 10/2001 |
| EP | 1 236 460 A2 | 9/2002 |
| EP | 1 236 640 A2 | 9/2002 |
| EP | 1 457 415 A2 | 9/2004 |
| EP | 1 457 415 A3 | 4/2005 |
| EP | 2 604 499 A1 | 6/2013 |
| EP | 2 664 535 A1 | 11/2013 |
| EP | 2 743 166 A1 | 6/2014 |
| EP | 2 862 788 A1 | 4/2015 |
| JP | H07-33070 A | 2/1995 |
| JP | H09-123978 A | 5/1997 |
| JP | H10-194185 A | 7/1998 |
| JP | H11-180376 A | 7/1999 |
| JP | 2000-118481 A | 4/2000 |
| JP | 2001-010581 A | 1/2001 |
| JP | 2001-239982 A | 9/2001 |
| JP | 2004-243920 A | 9/2004 |
| JP | 2010-013027 A | 1/2010 |
| JP | 2013-216176 A | 10/2013 |
| JP | 2015-174539 A | 10/2015 |

* cited by examiner

CONTROL METHOD AND DEVICES FOR CONTROLLING THE ELECTRIC MOTOR OF AN ELECTRIC BICYCLE

This application is a 35 U.S.C. § 371 National Stage Application of PCT/EP2017/057699, filed on Mar. 31, 2017, which claims the benefit of priority to Serial No. DE 10 2016 209 275.8, filed on May 30, 2016 in Germany, the disclosures of which are incorporated herein by reference in their entirety.

The disclosure relates to a control method for controlling the electric motor of an electric bicycle and to a control apparatus which executes a control method, as well as to an electric bicycle having the control apparatus.

BACKGROUND

Document DE 10 2010 028 658 A1 describes an electric bicycle, wherein the electric motor generates a torque for driving the electric bicycle. The control of the motor torque is carried out in this document as a function of the pedaling torque of the cyclist. Furthermore, a shift operation of an electronically controllable gearshift of the electric bicycle as a function of at least one actual operating parameter is disclosed. The actual operating parameter can comprise, for example, the pedaling torque or the pedaling frequency of the cyclist.

SUMMARY

The disclosure relates to a control method for controlling the electric motor of an electric bicycle as a function of an engaged transmission ratio of a gearshift and to a control apparatus which executes the control method, as well as to an electric bicycle having the control apparatus.

The control method according to the disclosure comprises at least one detection process of a pedaling torque of the cyclist and one detection process of the engaged transmission ratio of the gearshift. A torque for driving the electric bicycle is generated by a control process of the electric motor as a function of the detected pedaling torque and the detected transmission ratio. As a result, a pleasant motor control process when riding is implemented for the cyclist.

In one preferred refinement of the disclosure, the control method has a comparison of the detected transmission ratio with a transmission ratio of the gearshift which has been detected immediately beforehand. The control process of the motor torque takes place when a change in the transmission ratio is detected. The motor torque is increased here in order to implement a constant overall power of the electric bicycle, assuming a constant pedaling torque, when the transmission ratio is increased. The motor torque is lowered if the transmission ratio is reduced during the shifting process. The pedaling torque of the cyclist can accordingly remain constant during the shifting process. The preferred refinement has the advantage that a very comfortable riding sensation is produced during the shifting process.

The control method preferably comprises a detection process of a current pedaling frequency of the cyclist. The control of the motor torque is carried out additionally as a function of the detected pedaling frequency. As a result, the control process of the motor torque can be adapted to the pedaling frequency of the cyclist. The product of the pedaling torque and the pedaling frequency of the cyclist furthermore represents the power of the cyclist. The control process of the motor torque can accordingly be carried out in this refinement as a function of the power of the cyclist. This has the advantage of a control process of the motor torque which is more pleasant for the cyclist.

In one preferred refinement of the disclosure, the control method has a comparison of the detected transmission ratio with a transmission ratio of the gearshift which has been detected immediately beforehand. The control process of the motor torque takes place when a change in the transmission ratio is detected. The motor torque is increased here in order to implement a constant overall power of the electric bicycle, assuming a constant pedaling torque, when the transmission ratio is increased. The motor torque is lowered if the transmission ratio is reduced during the shifting process. The pedaling torque of the cyclist can accordingly remain constant during the shifting process. The preferred refinement has the advantage that a very comfortable riding sensation is produced during the shifting process.

The control process of the motor torque is preferably carried out continuously. As a result, jumps in the motor torque are avoided, which advantageously results in a pleasant power assistance for the cyclist.

In one development of the disclosure, a comparison of the detected pedaling frequency with at least one further threshold value is carried out, wherein, in particular, a third threshold value and a fourth threshold value are provided. When the third threshold value is reached or exceeded, a shifting operation of an electronically controllable gearshift into a relatively low transmission ratio is carried out. When the fourth threshold value is reached or exceeded, a shifting operation of the electronically controllable gearshift into a relatively high transmission ratio is carried out. As a result of the automatic shifting of the gearshift, the torque jump, which typically occurs during the shifting process, is minimized and the time of shifting is optimized. This results in a very comfortable riding sensation.

The shifting process of the electronically controllable gearshift preferably takes place after the control process of the torque of the electric motor. As a result, the torque of the electric motor is adapted before the shifting of the gearshift, as a result of which the torque jump during shifting is minimized and an engine control process which is matched to the driving behavior is implemented.

The control apparatus according to the disclosure is configured to execute the method according to the disclosure. The control apparatus has at least one computing unit. This computing unit detects a variable representing the pedaling torque of the cyclist. Furthermore, a variable representing the engaged transmission ratio of the gearshift is detected. The computing unit generates a control signal for the electric motor as a function of the detected pedaling torque and the detected transmission ratio. A control apparatus according to the disclosure controls the engine torque for a particularly pleasant riding sensation during the shifting of the gearshift.

In a further refinement, the computing unit detects a variable representing the pedaling frequency of the cyclist. The computing unit generates the control signal for the electric motor additionally as a function of the detected pedaling frequency. This has the advantage of optimized adaptation of the torque control process to the riding behavior of the cyclist.

In one preferred development, the computing unit of the control apparatus generates a further control signal for an electronically controllable gearshift as a function of the detected pedaling torque and/or of the detected pedaling frequency. This provides the advantage that the control apparatus performs the shifting of the gearshift, and the cyclist can concentrate to a great extent on the traffic, for example.

The shifting process into another transmission ratio is preferably carried out by means of the further control signal as a function of the control process of the motor torque. As a result of the coupling the control process of the torque and of shifting of the gearshift, a very continuous and gentle torque profile for the cyclist can be implemented.

The electric bicycle according to the disclosure comprises at least one electric motor for providing power assistance to the cyclist when providing drive to the electric bicycle. Furthermore, a first sensor for detecting a pedaling torque of the cyclist and a second sensor for detecting an engaged transmission ratio of the gearshift are arranged on the electric bicycle. The electric bicycle has a control apparatus for controlling the electric motor as a function of the detected pedaling torque and the detected transmission ratio. The electric bicycle according to the disclosure advantageously implements a comfortable riding sensation during the shifting of the transmission ratio.

In an alternative refinement, the electric bicycle has an electronically controllable gearshift. In this refinement, the control apparatus actuates the electronic gearshift as a function of the pedaling torque and/or of the pedaling frequency. The automatic shifting of the transmission ratio permits the cyclist to concentrate better on the cycling or the traffic, as a result of which safer cycling and a more comfortable riding sensation are produced.

BRIEF DESCRIPTION OF THE DRAWINGS

The disclosure will be explained below on the basis of preferred embodiments and appended drawings, in which.

DETAILED DESCRIPTION

Figure 1:
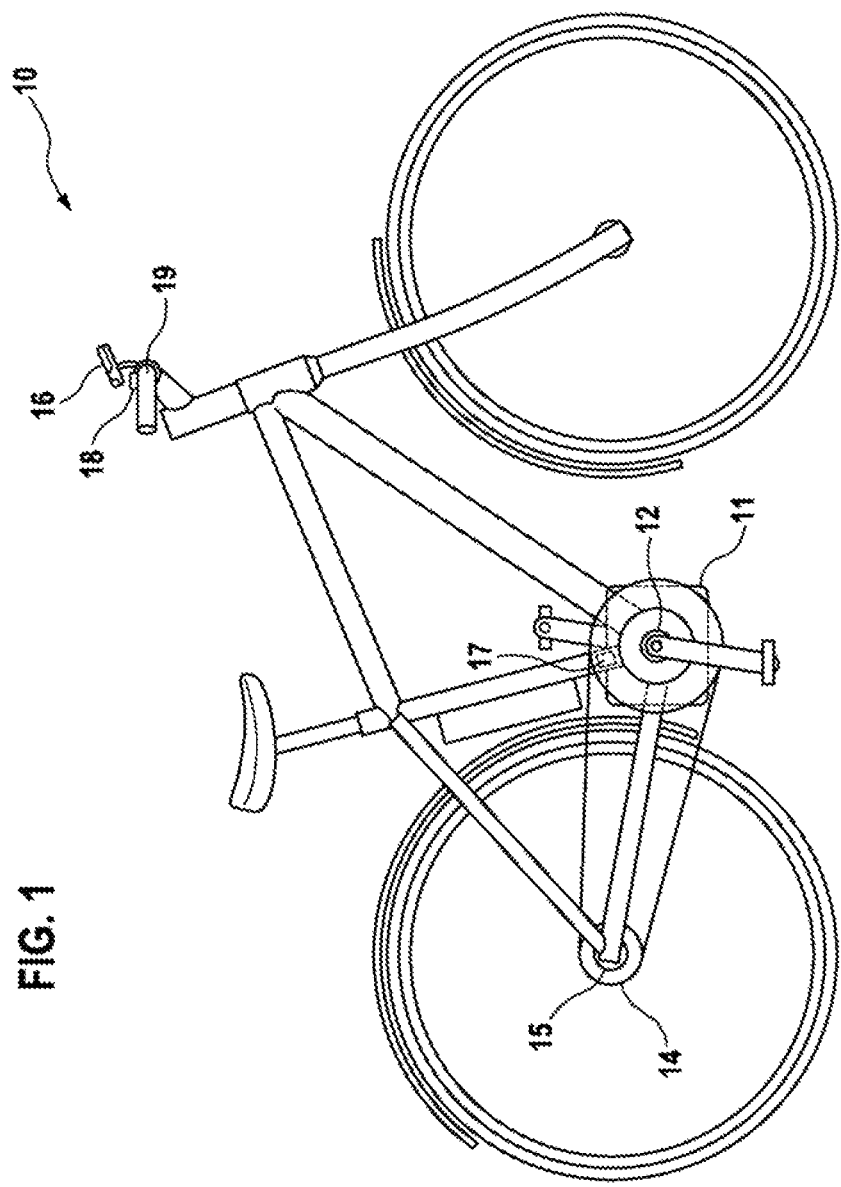
FIG. 1: shows an electric bicycle for the inventive execution of the control method.

FIG. 1 outlines an electric bicycle 10. The electric bicycle 10 has an accumulator and an electric motor 11. The electric motor 11 can be embodied as a mid-mounted motor on the crankshaft or alternatively can also be arranged in the hub of the front wheel or rear wheel. The electric bicycle 10 also has a gearshift 14 for changing the transmission ratio, i.e. for example, a hub-mounted system or a derailleur system. Alternatively, an infinitely variable gearshift 14 can be provided. The shifting process of the gearshift 14 is preferably carried out by means of a shift lever 18 on the handlebars. The control apparatus 16 actuates the electric motor 11. The control apparatus 16 can, as illustrated in FIG. 1, preferably be arranged on the handlebars 19 or alternatively on the accumulator or on the electric motor 11. The detection process of the at the crankshaft is preferably carried out by means of a first sensor 12. The engaged transmission ratio of the gearshift 14 is expediently detected by a second sensor 15 which can be arranged, for example, on the gearshift 14 or on the shift lever 18 of the gearshift 14. The detection process of the pedaling frequency K is carried out with an optional third sensor 17 on or in the vicinity of the crankshaft, the crank or the pedals.

The derailleur gearshifts and hub-mounted gearshifts of bicycles usually have discrete transmission ratios i, wherein the degradation of the gear speeds is dependent on the design of the gearshift and on the manufacturer. For example, a transmission ratio of a derailleur gearshift with a 53/39 chainring combination at the crankshaft and a sprocket set with 11 to 21 teeth on the rear wheel hub occurs in discrete steps between 1.86 to 4.82. Hub-mounted gearshifts with 3 or 8 gear speeds and infinitely variable gearshifts have similar transmission ratios to the derailleur gearshift described. Given a low transmission ratio of i=2, the wheels of a bicycle accordingly rotate, for example, with twice the rotational speed of the pedaling frequency of the cyclist.

The speed v of a bicycle can generally be derived as a product from the engaged transmission ratio i of the gearshift 14, the pedaling frequency K and the outer wheel circumference U. This applies generally for as long as the bicycle is actively powered, i.e. there is no idling or braking occurring. For example, as a result of the pedaling of a cyclist at a transmission ratio of i=2 with the pedaling frequency of K=80 rpm and an outer wheel circumference U=approximately 2.1 m (28" racing cycle tire) a speed v=approximately 20 km/h is reached, see also equation (2).

$$v = L \cdot I \cdot U \tag{2}$$

The pedaling power $P_{rider}$ of a cyclist can be assumed to be approximately constant at the time of the shifting of a transmission ratio. It can be described as a product of the pedaling frequency K and of the pedaling torque $M_{rider}$ of the cyclist, see equation (3).

$$P_{rider} = M_{rider} \cdot K \tag{3}$$

In order, for example to reduce the pedaling torque $M_{rider}$ in the case of a positive gradient on the route, the rider shifts into a relatively low transmission ratio i of a gearshift 14, wherein at the same time the pedaling frequency K increases. Since braking is not carried out during the shifting process, the speed v of the bicycle remains the same at the direct time of shifting ($v_1 = v_2$). According to equation (4) the pedaling frequency K changes discretely as a function of the transmission ratio i, i.e. for example as a function of the gradation of the gearshift.

$$v_2 = v_1 \Rightarrow K_2 = K_1 \cdot \frac{i_1}{i_2} \tag{4}$$

Given a constant pedaling power $P_{rider}$ at the time of the shifting of the transmission ratio there is a following dependence of the torque $M_{rider,2}$ on the transmission ratio $i_1$ and $i_2$ as well as the pedaling torque $Fi_{rider,1}$ according to equation (5).

$$M_{rider,2} = M_{rider,1} \cdot \frac{i_2}{i_1} \tag{5}$$

The control process of the electric motor 11 of an electric bicycle is typically carried out in the prior art as a function of the pedaling torque $M_{rider}$ or the pedaling frequency K of the cyclist. For example, the actuation is carried out in a linear dependence on the pedaling torque $M_{rider}$ and an assistance ratio α. This assistance ratio α is a quotient of the torque $P_{motor}$ of the electric motor and a pedaling torque $M_{rider}$ of the cyclist, see equation (6).

$$\alpha = \frac{M_{motor}}{M_{rider}} \quad (6)$$

During the shifting of a transmission ratio $i_1$ to $i_2$, the pedaling torque $M_{rider}$ consequently changes discretely (see equation (5)). Accordingly, the torque $P_{motor}$ of the electric motor 11 also changes discretely as a result of actuation of the constant assistance ratio $\alpha$ during the shifting process.

In an electric bicycle 10, the overall power $P_{electricbicycle}$ represents the sum of the pedaling power $P_{rider}$ of the cyclist and the motor power $P_{motor}$, wherein the motor power $P_{motor}$ can be described as a product of the torque $P_{motor}$ of the electric motor 11 and the angular speed $\omega$. The angular speed $\omega$ corresponds to the pedaling frequency of the cyclist and follows equation (7).

$$P_{electricbicycle} = P_{rider} + P_{motor} \quad (7)$$
$$= M_{rider} \cdot K + M_{motor} \cdot \varpi$$

The angular speed $\omega$ of the electric motor 11 and the pedaling frequency K of the cyclist are coupled to a mid-mounted motor in an electric bicycle 10, since there is a fixed transmission ratio c between the two. For this reason, equation (8) follows by means of algebraic simplifications.

$$P_{electricbicycle} = M_{rider} \cdot K \cdot (1 + \alpha \cdot c) \quad (8)$$

The total power $P_{electricbicycle}$ of an electric bicycle with a mid-mounted motor is accordingly also constant during the shifting of a transmission ratio with a constant assistance ratio $\alpha$ because the product of the pedaling torque $M_{rider}$ of the cyclist and the pedaling frequency K during the shifting of the gearshift can be assumed to be constant, as described above, (see equations (3) and (8)).

Figure 2B:
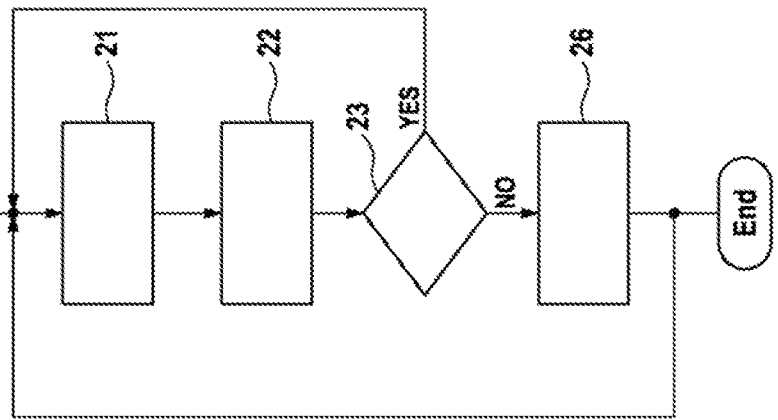
FIG. 2b: shows a flowchart relating to the control method with actuation when a transmission ratio of the gearshift changes.
Figure 2A:
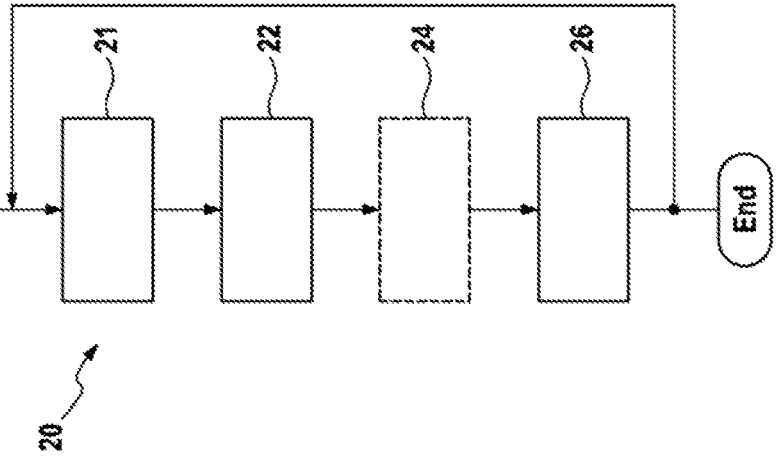
FIG. 2a: shows a flowchart relating to the inventive control method for actuating an electric motor.

FIG. 2a illustrates a possible flowchart of the control method 20 according to the disclosure for controlling the electric motor 11 of an electric bicycle 10. In a step 21, a pedaling torque $M_{rider}$ of a cyclist is detected. In a further step 22, the engaged transmission ratio of the gearshift 14 is detected. In a further step 26, the electric motor 11 is actuated as a function of the detected pedaling torque and the detected transmission ratio. A torque $M_{motor}$ for driving the electric motor is generated by the control process of the electric motor 11. The method according to the disclosure can proceed continuously or repeatedly.

After step 22, the pedaling frequency of the cyclist can be detected in an optional step 24. In this embodiment, the electric motor 11 is actuated in step 26 additionally as a function of the detected pedaling frequency.

In the alternative flowchart in FIG. 2b, a further step 23 for comparing the detected transmission ratio $i_2$ with the transmission ratio $i_1$ detected immediately beforehand is illustrated. If the currently detected transmission ratio $i_2$ is equal to the previously detected transmission ratio $i_1$, a change in the transmission ratio i is not detected and the motor torque $M_{motor}$ is not adapted. The adaptation of the motor torque $M_{motor}$ in step 26 is carried out only after the detection of a change in the transmission ratio i. The method according to the disclosure according to the flowchart in FIG. 2b can proceed continuously or repeatedly.

In one development of the method according to the flowchart in FIG. 2b, the motor torque $M_{motor}$ is adapted in step 26 in order to implement a constant total power P of the electric bicycle 10 on the premise of a constant pedaling torque $M_{rider}$ of the cyclist. The total power P of the electric bicycle 10 comprises a sum of the motor power $P_{motor}$ and the power $P_{rider}$ of the cyclist. The adaptation of the pedaling torque $M_{rider}$, necessary by the rider without a method, during shifting is compensated by the adaptation of the motor torque $M_{motor}$. It follows from the assumption of the constant pedaling torque $M_{rider}$ of the cyclist during the shifting that in this development of the disclosure only the pedaling frequency K is adapted to the new transmission ratio $i_2$ of the gearshift 14 by the cyclist during the shifting. The control of the motor torque $M_{motor}$ is carried out here as a function of a non-constant assistance ratio. The assistance ratio $\alpha_2$ after the shifting is dependent, according to equation (7), on the engaged transmission ratio $i_2$ as a result of the shifting and on the immediately previously engaged transmission ratio $i_1$ as well as on the immediately previously used transmission ratio $\alpha_1$. Accordingly, in this refinement of the disclosure, a change occurs in the motor torque $M_{motor}$ in step 26 after the shifting of the transmission ratio $i_2$, wherein the assistance ratio $\alpha$ is increased during the shifting into a relatively high transmission ratio and reduced during the shifting into a relatively low transmission ratio.

$$M_{rider,1} \cdot (1 + \alpha_1) \cdot K_1 = M_{rider,1} \cdot (1 + \alpha_2) \cdot K_2 \quad (7)$$
$$\Rightarrow \alpha_2 = (1 + \alpha_1) \cdot \frac{i_2}{i_1} - 1$$

This means, for example, that during the shifting of the transmission ratio $i_1=2$ given an original assistance ratio of $\alpha_1=1$ after the shifting to $i_2=2.5$ a new assistance ratio of $\alpha_2=1.5$ results. In this example, the torque $M_{motor}$ of the electric motor 11 is therefore increased by 50% immediately after the shifting. Necessary pedaling frequency K correspondingly decreases equation (3) by 20%. For this example, the cyclist can, as in the above development of the method according to the disclosure, describe keeping the torque $M_{rider}$ constant during the shifting.

Figure 2C:
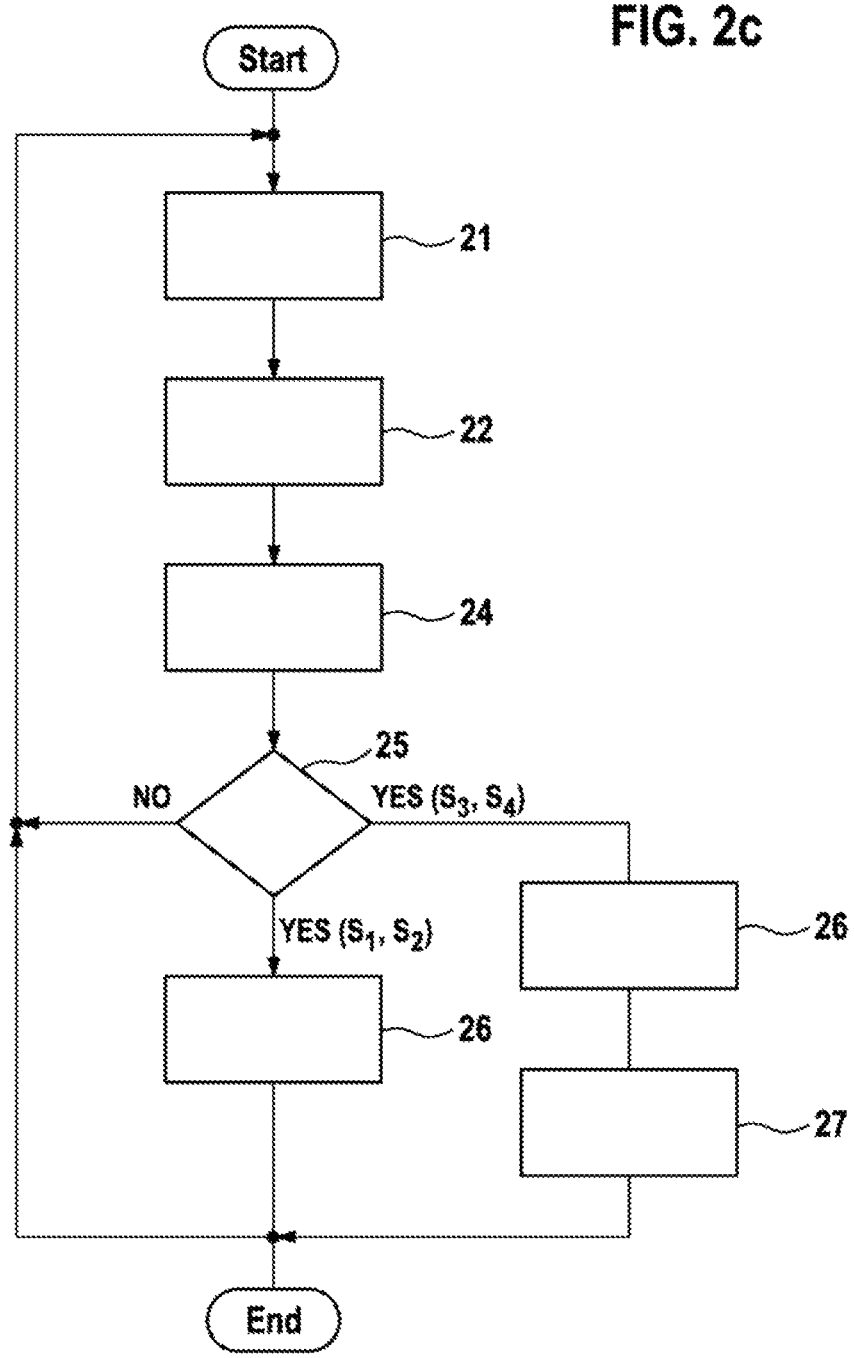
FIG. 2c: shows a flowchart relating to the control method with shifting of an electronically controllable gearshift.

In the flowchart in FIG. 2c, a further particular preferred refinement of the invention disclosure is illustrated. In this refinement, a step 24 for detecting the pedaling frequency K is carried out before the control process of the motor torque $M_{motor}$. Furthermore, in a step 25 after the detection of the pedaling frequency K and before the control process of the motor torque $M_{motor}$ the pedaling frequency K is compared with four threshold values. If the pedaling frequency lies between the first threshold value $S_1$ and the second threshold value $S_2$, the motor torque $M_{motor}$ is not adapted. If the detected pedaling frequency K reaches or exceeds the first threshold value S or the second threshold value $S_2$, in step 26 the control process of the motor torque $M_{motor}$ is carried out according to a method according to the disclosure, wherein control this process can additionally be carried out as a function of the pedaling frequency K. If the pedaling frequency reaches or exceeds the third threshold value $S_3$ or the fourth threshold value $S_4$, in step 26 the control process of the motor torque $M_{motor}$ is carried out and then in step 27 the shift operation of an electrically controllable gearshift 14 into another transmission ratio $i_2$ is carried out. The method according to the disclosure according to the flowchart in FIG. 2c can accordingly proceed continuously or repeatedly.

Figure 3:
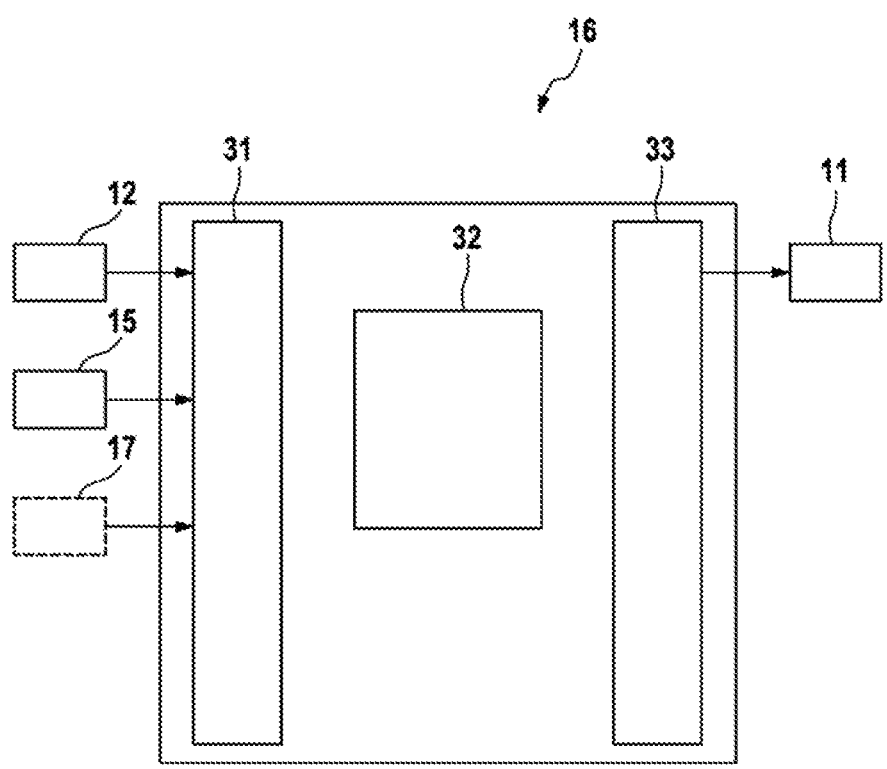
FIG. 3: shows a control apparatus relating to the inventive execution of the control method.

The control apparatus 16 according to the disclosure is illustrated in FIG. 3. The control apparatus 16 has at least one computing unit 32. The computing unit 32 detects a variable representing the pedaling torque $M_{rider}$, and a variable representing the engaged transmission ratio i. Furthermore, the computing unit 32 generates a control signal for the electric motor 11 for adapting the motor torque $M_{motor}$. The control apparatus can have a receiver unit 31 for detecting variables and an output unit 33 for outputting the sensor signal. As an option, the computing unit 32 additionally detects a variable representing the pedaling frequency K. The detected variables can constitute, for example, sensor variables of the first sensor 12, of the second sensor 15 and/or of the third sensor 17.

The invention claimed is:

1. A control method for an electric motor of an electric bicycle having a cyclist, the control method comprising:
   detecting a pedaling torque applied to the electric bicycle by the cyclist;
   detecting an engaged transmission ratio of a gearshift of the electric bicycle; and
   generating a torque with the electric motor according to a control process of the electric motor as a function of the detected pedaling torque and of the detected transmission ratio.

2. The control method as claimed in claim 1, further comprising:
   comparing the detected transmission ratio with a transmission ratio of the gearshift which has been detected immediately beforehand; and
   when a change in the transmission ratio is detected
   increasing or reducing the torque in order to implement a constant overall power of the electric bicycle additionally as a function of the change in the transmission ratio.

3. The control method as claimed in claim 1, further comprising:
   detecting a current pedaling frequency of the cyclist; and
   controlling the torque additionally as a function of the detected pedaling frequency.

4. The control method as claimed in claim 3, further comprising:
   comparing the detected pedaling frequency with a first threshold value and a second threshold value;
   reducing the torque of the electric motor when the first threshold value is reached or exceeded; and
   increasing the torque of the electric motor when the second threshold value is reached or exceeded.

5. The control method as claimed in claim 1, further comprising:
   controlling the torque continuously with the control process.

6. The control method as claimed in claim 3, wherein the gearshift is an electronically controllable gearshift, the method further comprising:
   comparing the detected pedaling frequency with a third threshold value and a fourth threshold value;
   shifting the electronically controllable gearshift into a relatively low transmission ratio when the third threshold value is reached or exceeded; and
   shifting the electronically controlled gearshift into a relatively high transmission ratio when the fourth threshold value is reached or exceeded.

7. The control method as claimed in claim 6, wherein the shifting process of the gearshift is carried out after the control process of the torque of the electric motor.

8. A control apparatus comprising:
   at least one computing unit configured to execute a control method for an electric motor of an electric bicycle having a cyclist, the at least one computing unit configured to
   detect a variable representing a pedaling torque of the cyclist,
   detect a variable representing an engaged transmission ratio of a gearshift, and
   generate a control signal of the electric motor as a function of the detected pedaling torque and the detected transmission ratio.

9. The control apparatus as claimed in claim 8, wherein the at least one computing unit is further configured to
   detect a variable representing the pedaling frequency of the cyclist,
   wherein the control signal for the electric motor is generated additionally as a function of the detected pedaling frequency.

10. The control apparatus as claimed in claim 8, wherein the gearshift is an electronically controllable gearshift and the at least one computing unit is further configured
    to generate a further control signal for the electrically controllable gearshift as a function of the detected pedaling torque and/or the detected pedaling frequency,
    wherein a shifting process of the electronically controllable gearshift into another transmission ratio is carried out as a function of the control process of the torque of the electric motor.

11. An electric bicycle for a cyclist, comprising:
    an electric motor configured to drive the electric bicycle;
    a first sensor configured to detect a pedaling torque of the cyclist; and
    a second sensor configured to detect an engaged transmission ratio of a gearshift; and
    a control apparatus configured to control the electric motor as a function of the detected pedaling torque and of the detected transmission ratio.

12. The electric bicycle as claimed in claim 11, further comprising:
    an electronically controllable gearshift,
    wherein the control apparatus is configured to actuate the electronically controllable gearshift as a function of the pedaling torque and/or of the pedaling frequency.

* * * * *